United States Patent
Foladare et al.

[11] Patent Number: 6,134,454
[45] Date of Patent: *Oct. 17, 2000

[54] SYSTEM AND METHOD FOR MAINTAINING PERSONAL COMMUNICATIONS INFORMATION IN A MOBILE COMMUNICATIONS SYSTEM

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corp., Middletown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/573,839

[22] Filed: Dec. 18, 1995

[51] Int. Cl.[7] ........................................ H04Q 7/20
[52] U.S. Cl. ............................................. 455/556
[58] Field of Search ........................... 379/56, 57, 58, 379/59, 357; 455/33.1, 456, 433, 517, 31.3, 557, 558; 340/825.44

[56] References Cited

U.S. PATENT DOCUMENTS

| | | | |
|---|---|---|---|
| 5,335,246 | 8/1994 | Yokev et al. | 340/825.44 |
| 5,408,683 | 4/1995 | Ablay et al. | 455/433 |
| 5,423,060 | 6/1995 | Masuda et al. | 455/517 |
| 5,506,886 | 4/1996 | Maine et al. | 455/31.3 |
| 5,522,089 | 5/1996 | Kikinis et al. | 379/357 |
| 5,530,918 | 6/1996 | Jasinski | 455/525 |
| 5,561,840 | 10/1996 | Alvesalo et al. | 455/433 |
| 5,570,412 | 10/1996 | LeBlanc | 455/456 |
| 5,604,787 | 2/1997 | Kotzin et al. | 455/558 |

FOREIGN PATENT DOCUMENTS

WO 92/08311  5/1992  WIPO ................ 379/58

Primary Examiner—Dwayne D. Bost
Assistant Examiner—Myron K. Wyche

[57] ABSTRACT

The invention is an apparatus and method for updating a communications network from one or more user communications devices. The invention uses the electronic scheduling or other time-based features within a communications device to control and/or initiate transmission of information between the communications device and the communications network. Information from one or more communications devices is updated to the communications network in response to time-based components in the information entries corresponding to a timing device associated with the respective communications device. Also, once the network has received this updated information, comparisons of related information entries are initiated to detect discrepancies therebetween. In this manner, user submitted time and geographic location information is compared with similar information automatically retrieved by the communications network using conventional and future network communications technology. Any detected discrepancies are used and/or retrieve updated information to initiate appropriate notification to the user or to default to existing message delivery systems.

26 Claims, 4 Drawing Sheets

SYSTEM AND METHOD FOR MAINTAINING PERSONAL COMMUNICATIONS INFORMATION IN A MOBILE COMMUNICATIONS SYSTEM

BACKGROUND OF THE INVENTION

1. Field of the Invention

The invention relates to personal communications with communications devices. More particularly, the invention relates to transferring information within communications systems using one or more communications devices.

2. Description of the Related Art

Communications systems in today's mobile society involve numerous communications devices, including telephones, cellular telephones, pagers, personal computers, laptop computers, personal digital assistants (PDAs), modems, facsimile machines, and the networks, signal switching stations, paging stations and affiliated services that maintain the communication relationships between these devices. Advancing mobile phone technology and radio paging systems have done much to reduce inconveniences associated with varying locations of one or more of these communications devices during use.

Important to reducing inconveniences within communications systems having mobile users is a network or system of networks that is readily accessible and contains the most current information regarding the communications devices. Such information includes, e.g., the identity and location of a particular communications device at a given time, and the actual content of the information being transmitted by or to such devices, whether it be voice or data information.

For example, in a paging system, a mobile individual carries a portable pager. Typically, the pager is assigned a paging number and is capable of receiving a radio signal. When a caller dials the pager's number, a radio signal is broadcast from a paging service or similar location and the pager responds to the paging signal by activating an audible and/or visual alarm. The alarm serves to alert the mobile individual that an attempt to two way contact the individual has been made.

Many pagers support two-way communications, i.e., the pagers are equipped to transmit to as well as receive radio paging signals from a paging service. Information transmitted from pagers to a paging service includes, e.g., the identity and location of the pager at the time of the transmission. The accuracy of determining the location of the pager is based on existing and future network capabilities.

In addition to establishing communications with other devices, many communications devices are equipped to perform other functions independent of other communications devices including the storage, processing and dissemination of information. For example, personal computers (including desktop and laptop computers) and PDAs have relatively extensive information processing and storage features.

Typically, the PDAs and personal computers are equipped with phonebook electrical and scheduling capabilities. Often, the information contained therein is accessible by external expedients. For example, an electronic phonebook entry can be accessed manually and transmitted via a modem to place a telephone call. Similarly, a scheduling entry can be displayed or activated on a particular day and at a time corresponding to the device's internal clock or its access to an external clock.

It would be desirable to improve the transfer and maintenance of information within existing and future communications systems in a manner that enchances the accuracy currentness of the information within the communications systems.

SUMMARY OF THE INVENTION

The invention is an apparatus and method for updating a communications network from one or more user communications devices. In particular, the invention uses the electronic scheduling or other time-based features within a communications device to control and/or initiate transmission of information between the communications device and the communications network. Information from one or more communications devices is updated to the communications network in response to time-based components in the information entries corresponding to a timing device associated with the respective communications device. Also, once the network has received this updated information, comparisons of related information entries are initiated to detect discrepancies therebetween. In this manner, user submitted time and geographic location information is compared with similar information automatically retrieved by the communications network using conventional and future network communications technology. Any detected discrepancies are used to initiate appropriate notification to the user or to default to existing message delivery systems.

DETAILED DESCRIPTION

Figure 1:
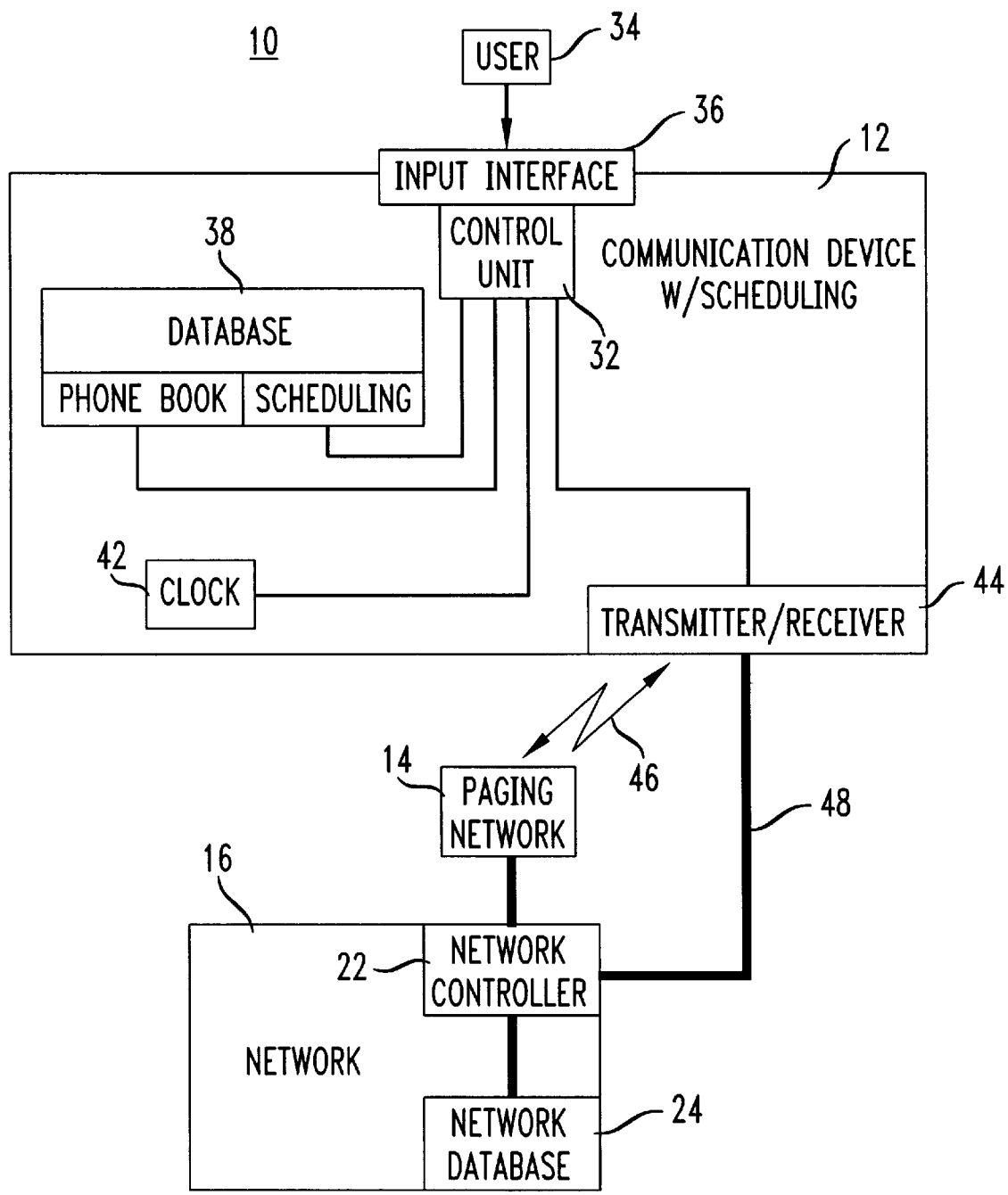
FIG. 1 is a schematic view of a communications system according to an embodiment of the invention.

In the following description similar components are referred to by the same reference numeral in order to simplify the understanding of the invention.

Referring to FIG. 1, a schematic view of a communications system 10 according to an embodiment of the invention is shown. Included as part of communications system 10 is at least one communications device 12 having, e.g. an electronic scheduler and/or phonebook. Such communications devices include, e.g., desktop computers, portable computers, PDAs, certain watches and calculators, telephones, pagers and the like. For purposes of discussion in this description, an electronic scheduler and/or electronic scheduling are understood to be anything associated with a communications device that provides any accountability for the schedule of one or more users within a communications system of interest. Similarly, an electronic phonebook or electronic phonebook capabilities are understood to be anything associated with a communications device that provides any accountability for the name, phone number and other related information associated with one or more users within the communications system of interest.

Communications system 10 also includes one or more paging networks 14 and/or one or more wireline networks 16. Operably connected to or contained within network 16 is a network controller 22, which processes information received from, e.g., paging network 14 and communications device 12. Also, network 16 includes a database 24 that stores various information received by network 16 via network controller 22. Although network controller 22 is shown and described as being part of the communications network itself, it will be understood by those skilled in the art that network controller 22 can be separate from network 16 and/or network database 24 with only an operable connection therebetween.

Communications device 12 includes a controller or control unit 32 for receiving information entries from a user 34 via any suitable input interface 36, e.g., a keyboard, a speech recognition module, a disk drive or other device that transfers information from one or more users to communications device 12. Control unit 32 is in operable connection with a database 38, which stores information (e.g., phonebook and scheduling information) entered into communications device 12. For example, the information stored in database 38 includes entries containing information associated with personal appointments of user 34 and containing the names, addresses, phone numbers of various people associated with user 34. Although shown as part of communications device 12, database 38 need only be accessible by communications device 12 for a period of time long enough to accept information transferred therefrom.

Also, control unit 32 is operably connected to a clock or timing device 42 and a transmitter 44. Clock 42 is any suitable timing device that provides control unit 32 with time-based information, such as a timepiece contained within communications device 12, as shown, or an internal module that obtains time-based information from sources external to communications device 12. Time-based information includes, e.g. the day, the time of day and the date.

Transmitter 44 is any device that transmits information in a suitable format and through an appropriate medium from communications device 12 to any of a number of other communications devices, including, e.g., paging network 14 and wireline network 16. Transmitter 44 is removably attached to communications device 12 or, alternatively, is installed or otherwise contained within communications device 12. For example, transmitter 44 is a two-way pager or wireless modem inserted into a PCMIA slot of a portable communications device 12, and broadcasts information from communications device 12 in the form of radio signals (shown as 46) for reception by paging network 14.

Alternatively, the information is transmitted over wired lines (shown as 48) using conventional technology. That is, the information is transmitted in the form of electrical impulse signals across electrical wiring or optical radiation signals across optical fiber.

Figure 2:
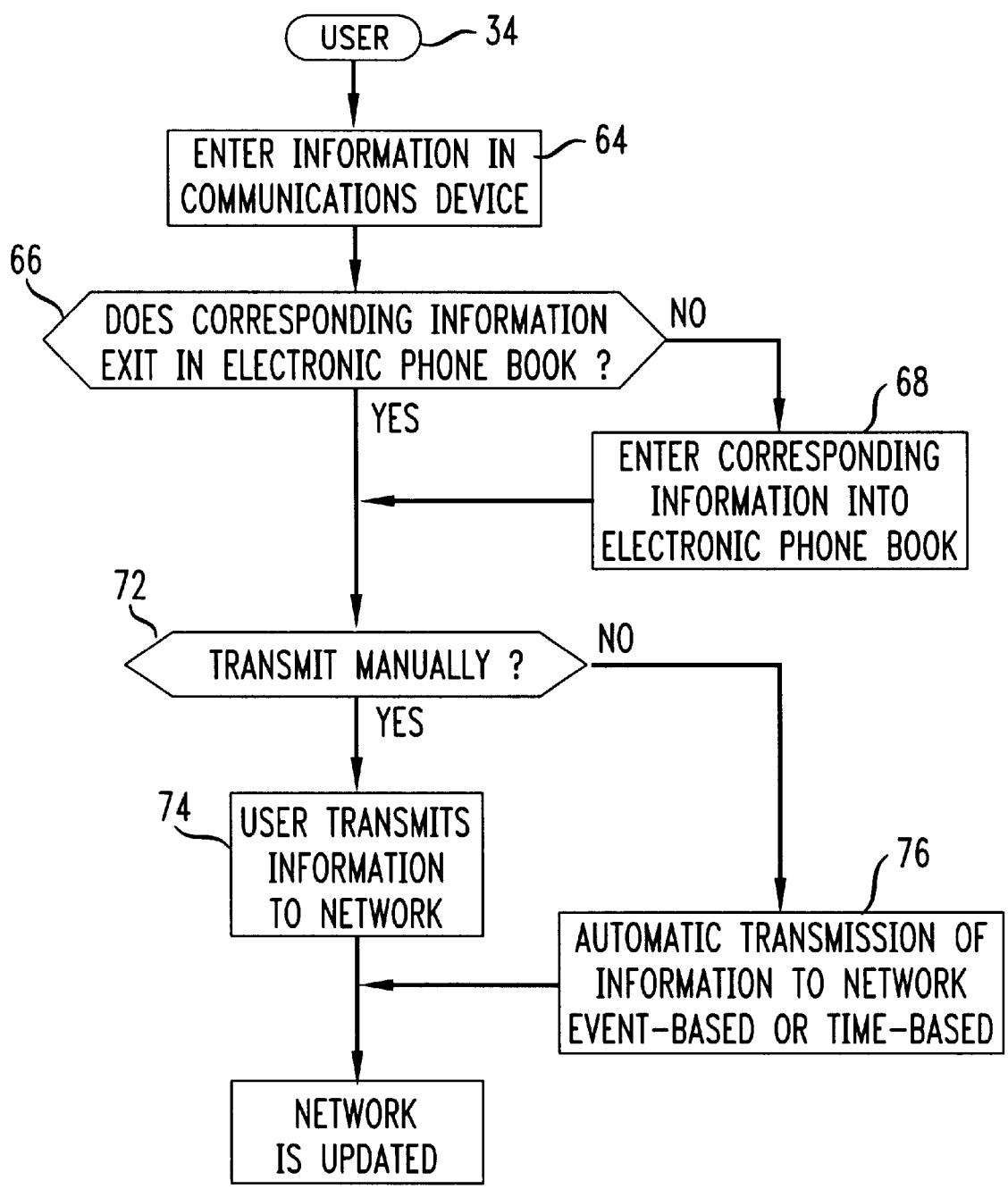
FIG. 2 is a flow chart depicting operation of the invention according to the embodiment shown in FIG. 1.

FIG. 2 shows a flow chart diagram depicting the operation of communications system 10 shown in FIG. 1 according to an embodiment of the invention. Communications system 10 is used, for example, to update network information via portable communications device 12 (e.g., a PDA or laptop computer) as to the location of user 34 and, perhaps, a phone (or pager) number in which to reach user 34. The first step 64 shown in the flow chart diagram is that of entering appropriate information into communications device 12, e.g., for an upcoming meeting in which user 34 plans to attend. That is, user 34 enters into the electronic scheduling portion of database 38 the date and time of the meeting and either the location of the meeting or the party user 34 intends to meet with.

The information entries contains, e.g., time based components (i.e., the date and time the meeting is to be held) and a location-based component (e.g., where or with whom the meeting is to be held). From these two components, any remaining necessary information components are obtainable either through accessing database 38 or by querying user 34.

In this manner, a first conditional branch 66 queries whether the entered information has any related information already existing in the electronic phonebook portion of database 38. For example, if the entered information indicates that a meeting is to be held at a particular location, first conditional branch 66 queries whether the name, phone number and/or other information (including non-essential information) associated with the person at that location exists already in database 38. If so, no additional information needs to be entered (except for possibly an affirmation) and the remaining information is accessed subsequently, e.g., by control unit 32. If not, control passes to a step 68, which instructs user 34 to enter any remaining information. This subsequently entered information, if essential is also stored in the electronic phonebook portion of database 38 for any subsequent accessing.

Conditional branch 66 includes additional queries, e.g., whether the meeting is to be disturbed by calls. If the meeting is not to be disturbed by calls, perhaps no other queries are necessary. However, if the meeting is to be disturbed by a telephone, paging or other type of call, the proper calling numbers need to be identified. Thus, an additional query included in conditional branch 66 is whether a number or group of numbers typically associated with a particular location or party are proper for the meeting. If so, no additional information needs to be entered except for, possibly, an affirmation. If not (i.e., if the meeting is being held at a location with a phone number or group of numbers not normally identified with the party being met with), entry of the correct number or numbers is made.

Once all of the necessary information regarding the meeting has been entered into communications device 12, a second conditional branch 72 queries user 34 regarding transmission of the information from communications device 12. If user 34 chooses to update the information in network 16 immediately, a manual transmission step 74 is executed by user 34. However, if user 34 desires the information to be transmitted automatically, an automatic transmission step 76 transmits information entries at the appropriate time, based on the time-based component of the information entry and/or the timing device 42 of communications device 12.

For example, as will be discussed in greater detail below, automatic transmission step 76 is an event-based step that transmits information entries when the time-based component of the event captured in an information entry coincides with timing device 42. Alternatively, automatic transmission step 76 is a time-based step that transmits information entries at a particular time not necessarily related to the time of the event captured in an information entry.

Transmitted information entries, in addition to having time based components and location based component as a part thereof a device identification (e.g., a device identification code) unique to the particular communications device 12. It is this device identification that enables the source of the information transmission to be determined by existing and future information transmission technology. Also, as will be discussed later, the device identification allows certain additional aspects (e.g., general and specific location) of each particular communications device 12 to be determined by existing and future technology.

An inventive portion of communications system 10 includes automatic transmission step 76. In this step, the time-based component of an information entry as compared to timing device 42 is used to trigger the transmission of at least that particular information entry. Therefore, the electronic scheduling capabilities, particularly, the time-based functions thereof, are used in combination with the time-keeping functions of communications device 12 to control transmission of information entries from communications device 12.

Transmission of information entries in this manner is automatic in response to the contents of timing device 42, which, e.g., changes continuously with the passage of time. Thus, depending on the specific configuration of automatic transmission step 76, information entries are capable of being transmitted any time between entry into communications device 12 and the specific time reflected in its time-based component. For example, if user 34 has a meeting at 10:00 AM on the 15th of the month and enters such information into communications device 12 at approximately 3:00 PM on the 7th of the month, automatic transmission step 76 is capable (via appropriate configuration) of transmitting the pertinent information regarding this meeting at any time between 3:00 PM on the 7th and 10:00 AM on the 15th (including transmission at exactly 10:00 AM on the 15th).

As shown in FIG. 1, transmitter 44 transmits information entries via an appropriate communications couping. That is, information entries to be received by paging network 14 are transmitted via radio signals 46. Similarly, information entries to be received directly by network controller 22 are transmitted, e.g. via wireless infrared signals, via electrical impulse signals across electrical wiring or via optical radiation impulse signals across optical fiber (shown generally as 48).

Network controller 22 uses the device identification code in each information entry to store the appropriate information therefore in the appropriate area of network database 24. As previously discussed, such information includes, e.g., the date, time and location of a meeting, the party to be meeting with, whether the meeting is to be disturbed and, if so, a number for reaching the meeting. Also, network controller 22 receives information indicating the identity and location of communications device 12.

In this manner, network controller 22 and network 16 are updated with information regarding the actual and/or expected location of user 34. As will be discussed below, such information is used, for example, in conjunction with other inventive aspects and with existing and future network communications technology.

Figure 3:
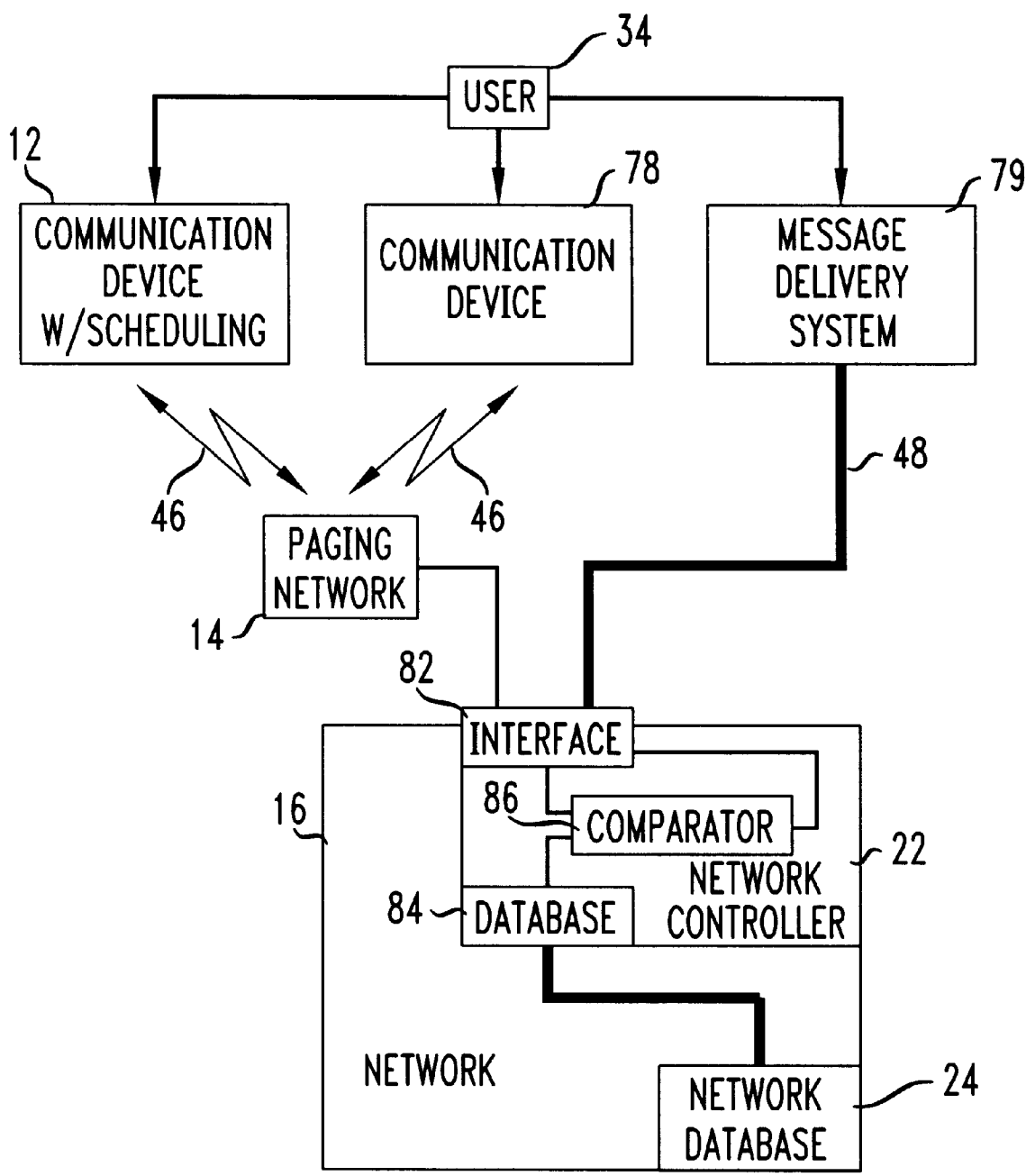
FIG. 3 is a schematic view of a communications system according to another embodiment of the invention.

Referring to FIG. 3, a schematic view of a communications system 10 according to an embodiment of the invention is shown for a user 34 having access to one or more communications devices 12, 78, in which at least one communications device has electronic scheduling capabilities. For example, communications device 12 is a PDA or laptop computer with electronic scheduling features and communications device 78 is a two-way pager operably contained within communications device 12 or worn by user 34. Also, as will be discussed later, user 34 has access to a message delivery system 79.

Communications system 10 includes a network 16 comprising a network database 24 and a network control point (NCP) or controller 22. In this embodiment, network controller 22 includes an interface 82, a network controller database 84 and a comparator 86, all of which are operably connected as shown. Also, network controller 22 is in operable connection with network database 24 as shown.

Also included as part of communications system 10 is a paging network 14. Communications devices 12, 78 communicate with paging network 14, e.g., by transmitting radio signals 46 to the reception area of paging network 14. However, it is to be understood that information can be transmitted directly to network controller 22 with appropriate coupling. For example, if communications device 12 is a desktop computer, information therefrom is transmitted, e.g., via a modem or a wired connection between the desktop computer and network interface 82.

In general, network controller 22 manages the storage and movement of information to network 16 and between network 16 and its interface 82. For example, network interface 82 receives information from a plurality of communications devices, including communications devices 12, 78 (via paging network 14) and message delivery system 79 (via coupling 48). Also, network interface 82 is used to transmit information from network 16 to those same communications devices, as well as to paging network 14 and message delivery system 79.

Network controller database 84 provides data storage on at least a temporary basis for information moving between network interface 82 and network database 24. Comparator 86, whose operation will be discussed in greater detail later, verifies the accuracy of certain information stored in network controller database 84 as compared to information passing through network interface 82.

Network database 24 stores therein information received from network controller 22. Also, network database 24 maintains network operating codes (e.g., telephone call routing destinations and instructions) for use by network 16 and network controller 22 in managing information flowing into and out of network 16.

Figure 4:
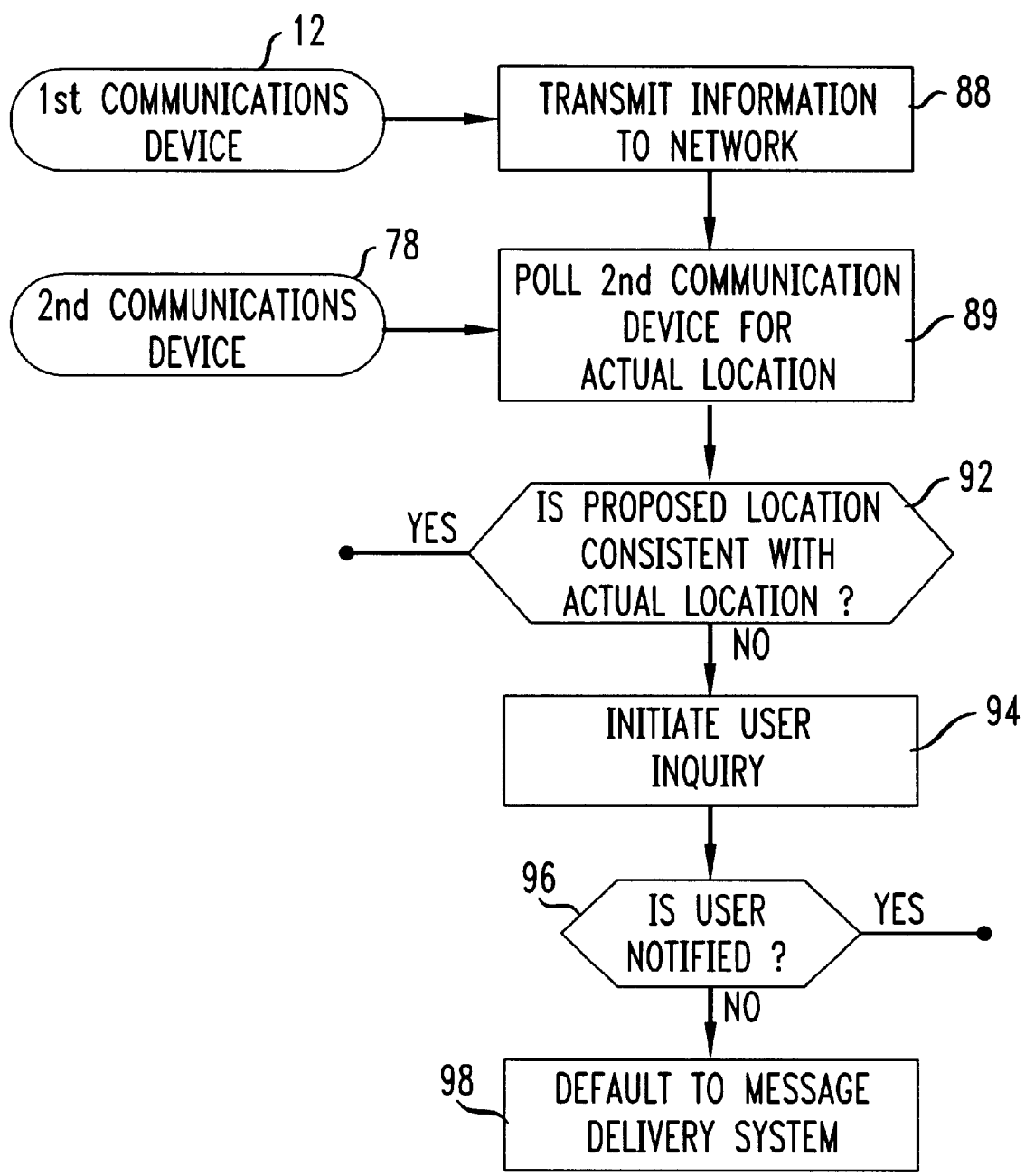
FIG. 4 is a flow chart depicting operation of the invention according to another embodiment of the invention.

FIG. 4 is a flow chart diagram illustrating one manner in which the communications system shown in FIG. 3 operates in determining the location of user 34 according to an embodiment of the invention. In general, the location of user 34 is compared (or cross-referenced) via information transmitted from one or more communications devices, e.g., first communications device 12 and second communications device 78. As stated previously, in one embodiment of the invention, first communications device 12 is a PDA and second communications device 78 is a two-way pager operably contained therein whereby such arrangement is considered to be a single communications device.

Alternatively, the proposed location and the actual location of user 34 is compared via information transmitted at different times from one or more communications devices. For example, information indicating where user 34 will be at a specified time in the future is transmitted and compared later at that specified time with information transmitted from one or more communications devices that indicates the actual location of user 34.

In the operation shown in FIG. 4, a first step 88 is the transmission of information from first communications device 12 to network 16, e.g., in the manner as described previously herein. For example, communications device 12 is a PDA or laptop computer with electronic scheduling that transmits to network 16 an information entry indicating the time and location of a future meeting for user 34.

Network controller 22 receives the information entry and uses the device identification code included therein to store the contents of the information entry in an appropriate location of network controller database 84 and/or network database 24. By appropriate location, it is meant that the information entry is stored so that it can be accessed based on one or more comparable components (e.g., a time-based component or a location-based component) contained therein. In this manner, network 16 is updated with accessible information identifying a location where user 34 is proposing to be at a specific time in the future.

A polling step 89 is then used at or near the specific meeting time to determine the actual location of a second communications device 78. For example, second communications device 78 is a pager operably contained within communications device 12 or carried by user 34 and is polled by paging network 14 to determine its approximate location in a manner known in conventional paging technology. Depending on system limits and/or configurations, polling is performed periodically, i.e., at a specified rate, or is performed continuously in a manner that is limited only by system constraints, cost and like considerations.

For example, if transmitter 44 (see FIG. 1) is a two-way pager, the geographic location of communications device 12 is determined from the location of the two-way pager by a paging antenna, e.g., a tower, of a conventional two-way paging system. However, it is understood to one skilled in the art that any two-way wireless communications device that is served by only one wireless communications source, e.g., an antenna or tower, at any particular time is suitable for identifying the geographic location of the communications device. This includes the use of a global positioning system (GPS).

The polled information is received by network controller 22 and is stored appropriately, e.g., in network controller database 84. Network controller 22 uses the device identification code contained in the polled information to retrieve any corresponding or related information from network database 24. The next step in the operation is a conditional branch 92 that compares (or cross-references) comparable components of the two information entries (i.e., the previous entry from first communications device 12 and the polled entry from second communications device 78) for discrepancies therebetween.

For example, network controller 22 is configured so that when the time-based components of the corresponding information entries coincide, the location-based components thereof are compared for accuracy. In this manner, conditional branch 92 tests to see if the two location-based components match, i.e., if the locations are approximately the same. If the location-based components match, communications network 16 is configured, so that nothing further needs to be done, at least for this particular time period. If the components do not match, communications network 16 is configured so that a user inquiry 94 is initiated. Alternatively, communications network 16 is configured to update the information entries form, e.g., second communications device 78 for subsequent comparison.

If user inquiry step 94 is successful in notifying user 34, communications network 16 is configured, so that no further action need be taken, at least with respect to the information entries relating to the specific meeting time. However, if user inquiry step 94 is unsuccessful in contacting or notifying user 34, the communications system is configured to default, e.g. to message delivery system 79. In this manner, for example, a message indicating that there exists a discrepancy between information entries is transmitted and/or routed to an appropriate communications device of user 34.

As mentioned previously, message delivery system 79 is operably connected to network controller interface 82 and makes use of, e.g., existing and future network communications technology. Thus, the inventive features described herein are shared with current and future message delivery systems 79 via appropriate transmission medium 48, as shown. Features of the message delivery systems include, e.g., the caller addressing system disclosed in U.S. Pat. No. 5,428,663 entitled "Incoming Communications Forwarding Technique Utilizing a Called Party Location Indicator".

It should be understood that communications system 10 is operable in this manner if first and second communications devices are two different communications devices, as just described, or if first and second communications devices are in fact the same communications device transmitting information entries at different times. Also, comparisons of information entries from more than one communications device or from one communications device transmitting a plurality of information entries is within the scope of the inventive features described herein.

The inventive features described herein fit easily within the infrastructure of existing networks, including paging networks. For example, the inventive features are incorporated into existing and future networks, e.g., through appropriate software additions and/or hardwired arrangements.

It will be apparent to those skilled in the art that many changes and substitutions can be made to the communications systems and operating methods herein described without departing from the spirit and scope of the invention as defined by the appended claims.

What is claimed is:

1. Portable apparatus comprising:
    a communications device including a timing device, a database for receiving from a user of said apparatus information entries comprising a data component and a component that specifies a time, and a transmitter for transmitting therefrom a device identification together with information based on at least a portion of said information entries, and
    a controller coupled to said database and to said transmitter for initiating the transmission a) in consultation with said timing device and b) based on said components of said information entries that specify time,
    where said data component includes either a telephone number to be included in the information string, or specifies that a step of ascertaining the physical location of said portable communications apparatus be carried out and the results of said step of ascertaining be included in the information string.

2. The apparatus of claim 1 wherein said transmitter comprises elements that allow said transmitter to transmit to wireline networks and elements that allow said transmitter to transmit to wireless networks.

3. Portable apparatus comprising:
    a communications device including a timing device, a database for receiving from a user of said apparatus information entries consisting of a portion that specifies a user-chosen time of transmission and a data portion, and a transmitter for transmitting therefrom a device identification together with information based on at least a portion of said information entries, and
    a controller coupled to said database and to said transmitter for initiating a transmission, in consultation with said timing device, based on said user-chosen and based on said data component of said information entry,
    where said data component includes a direction to ascertain the physical location of said apparatus at time of said transmission and to include the ascertained physical location in said transmission.

4. The apparatus as recited in claim 1, further comprising means to cause said controller to initiate transmission upon entry of an information entry into said apparatus.

5. The apparatus as recited in claims 1 or 3, wherein said communications device is selected from a group consisting of a PDA, a computer, an electronic scheduler, a telephone, a calculator and an electronic recording device.

6. The apparatus as recited in claim 1 where said component that specifies a time specifies an absolute time.

7. A method for transmitting information from a portable communications device to a communications system, said communications device having associated therewith a timing device, an information transmitter, and a database, said method comprising the steps of:

entering information entries into said database, said entering step including the selection of a time-based component for one or more of said information entries; and transmitting an identification and at least one of said information entries to said communications system in response to said timing device triggering said information transmission based on said time-based component associated therewith, where said information transmission imparts to said communication system information about a telephone number to which calls may be made.

8. The method as recited in claim 7, wherein said entering step further comprises selection, for the time-based component for one or more of said information entries, a date and time for transmission, via a scheduler associated with said communications device, and wherein said transmitting step further comprises transmitting in response to said timing device triggering said information transmission based on said date-based component associated therewith.

9. An apparatus for use with a communications network, said apparatus comprising:

a comparator; and an interface in operable connection with said communications network for receiving information entries from at least a pair of communications devices, where each one of said information entries includes at least a time-based information segment and a location-based information segment, the comparator includes stored information for said time-based information segment and location-based information segment, and said comparator is in operable connection with said interface for detecting discrepancies between said information segments received by said interface.

10. The apparatus as recited in claim 9, further comprising a timing device associated therewith, wherein one or more of said information entries includes a time-based component associated therewith, and wherein the operation of said comparator is triggered by said timing device based on said time-based component associated with said information entries.

11. The apparatus as recited in claim 9, wherein at least one of said communications devices has associated therewith an electronic scheduler that transmits information entries having time-based and location-based components therewith.

12. The apparatus as recited in claim 9, wherein at least one of said communications devices is a two-way pager that transmits information entries having time-based and location-based components as a portion thereof.

13. The apparatus as recited in claim 9, wherein said at least one pair of communications devices is selected from a group consisting of a pager, a PDA, a desktop computer, a portable computer, a telephone, a cellular telephone and a radio signal transmitter.

14. The apparatus as recited in claim 9, wherein said interface receives signals across a medium selected from the group consisting of electrical impulse signals across electrical wiring connected therebetween, optical radiation impulse signals across optical fiber connected therebetween, and radio broadcast signals across a wireless connection therebetween.

15. A method for use with a communications network for verifying communications information having time-based and location-based components, said method comprising the steps of:

receiving information entries from a first communications device, said communications information including a device identification, a time-based component and a location-based component;

coupling communications information to a network database from a second communications device, said communications information having associated therewith a device identification, a time-based component and a location-based component; and comparing said information received from said first communications device with corresponding communications information coupled from said second communications device to detect discrepancies therebetween.

16. The method as recited in claim 15, wherein said comparing step further comprises detecting discrepancies in said location-based components of said communications entry received from said first communications device and corresponding communications information received from said second communications devices having effectively the same time-based components.

17. The method as recited in claim 15, further comprising the step of initiating an inquisitive signal to a least one of said first and second communications devices if discrepancies are detected between said coupled communications information and said corresponding information entry.

18. The method as recited in claim 15, wherein said first communications device has a timing device associated therewith and wherein said receiving step further comprises receiving information entries transmitted upon initiation by said timing device associated with said first communications device.

19. The method as recited in claim 15, wherein said comparing step further comprises the steps of determining the location of said second communications device when said first communications device transmits said at least one information entry, and comparing the location of said second communication device to said location-based component of said at least one information entry transmitted.

20. The method as recited in claim 15, wherein said second communications device couples said communications information when said at least one information entry is transmitted by said first communications device.

21. The method as recited in claim 15, wherein said second communications device is located within one of a plurality of location areas and wherein said second communications device couples said communications information when said second communications device has entered a new one of said plurality of location areas.

22. The method as recited in claim 15, wherein said second communications device couples said communications information periodically.

23. The method as recited in claim 15, wherein said second communications device couples said communications information continuously.

24. The method as recited in claim 15, wherein at least one of said communications devices couples said communications information using a global positioning system.

25. The apparatus as recited in claim 9, wherein said interface initiates an inquisitive signal to at least one of said communications devices in response to discrepancy detection by said comparator.

26. The method as recited in claim 15, further comprising the step of updating information from at least one of said first and second communications devices when a discrepancy is detected between said coupled communications information and said corresponding information entry.

* * * * *